Patented June 2, 1925.

1,540,252

UNITED STATES PATENT OFFICE.

RUFUS N. CHAMBERLAIN, OF CHICAGO, ILLINOIS, ASSIGNOR TO GOULD STORAGE BATTERY COMPANY, OF DEPEW, NEW YORK, A CORPORATION OF NEW YORK.

STORAGE BATTERY.

Application filed August 27, 1921. Serial No. 496,009.

*To all whom it may concern:*

Be it known that I, RUFUS N. CHAMBERLAIN, a citizen of the United States, residing at Chicago, in the county of Cook and State of Illinois, have invented new and useful Improvements in Storage Batteries, of which the following is a specification.

This invention relates to a storage battery and has for its object the production of an improved seal joint between the tank and cover which is simple and durable in construction, and which forms a gas and liquid tight joint between the same through which battery fumes and electrolyte cannot penetrate.

Figure 1:
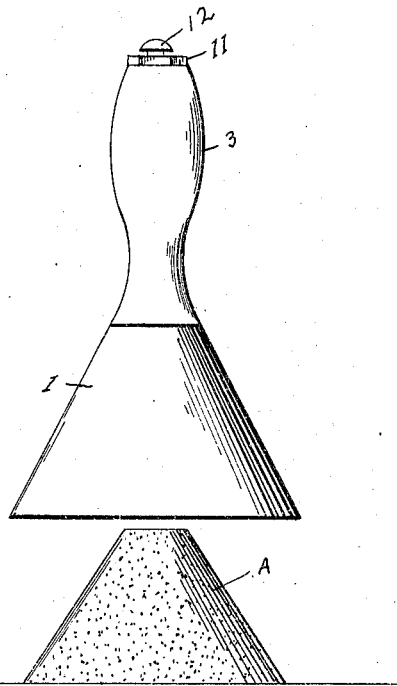
Figure 2:
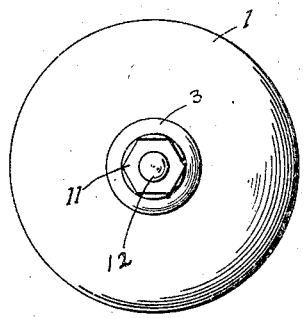
Figure 3:
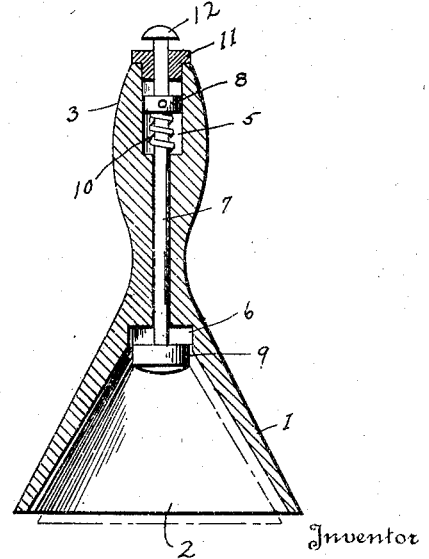

In the accompanying drawings: Figure 1 is a vertical section of a storage battery embodying my improvements. Figure 2 is a top plan view of the same, partly in section. Figures 3 and 4 are perspective views of the cover and tank of the battery containing my invention. Figure 5 is a fragmentary sectional view, on an enlarged scale, of the joint between the tank and the cover.

Similar characters of reference indicate corresponding parts throughout the several views.

10 represents the outer box of the battery, 11 the tank arranged in the box and adapted to contain the electrolyte, 12 the cover arranged over the upper end of the tank, 13, 13 the battery plates or elements arranged in the tank and immersed in the electrolyte and 14, 14 the terminals projecting from these plates upwardly through openings 16 in the cover and sealed therein by cement plugs 15 to form a gas and liquid tight joint between the same.

My improvement relates to the form of joint between the tank and the cover and in its preferred form the same comprises an upwardly opening channel 17 arranged at the upper end of the tank, a flange 18 depending from the marginal part of the cover into said channel, and a filling 19 arranged in said channel and securing the flange therein and forming a gas and liquid tight or sealed joint between the cover and tank, so as to effectually prevent the escape of any battery fumes and electrolyte through this joint. The channel extends entirely around the periphery of the tank and is preferably formed integrally with the body or side wall of the same and in the most approved form, the inner wall 20 of the channel is arranged vertically in line or flush with the wall of the tank while the outer wall 21 of the channel is arranged outwardly or a distance from the wall of the tank, as shown in Fig. 1.

The flange of the cover is also preferably formed integrally therewith and the same is arranged in the channel between the outer and inner walls thereof, so that the filling engages with both sides of the flange and securely seals the joint against leakage of gas or liquid. The filling may be a cement or sealing material of any suitable character such as pitch or cement which is not affected by the action of battery fumes or electrolyte.

By providing the cover with a flange which projects downwardly into the groove of the tank and filling the space between the flange and channel or groove with a cement, a joint is produced between these parts which is not only rigid and renders the same air tight but also acid tight, inasmuch as the surfaces of the tank groove and the cover flange form a tortuous path along which any acid would have to travel from the interior of the tank to the exterior thereof, and thus retards the escape of the acid if the joint should be imperfect or become loose.

In order to still further increase the line or path over which the acid would have to travel before the same would reach the exterior of the tank, the opposing surfaces of the groove and flange are corrugated or ribbed on one or both sides of the same, for example, as shown in the drawings, the inner surfaces of the channel or groove may be provided on both sides with horizontal corrugations or ribs 22 which are square in cross section and the opposite sides of the flange may be provided with horizontal corrugations or ribs 23 which are V-shaped in cross section. The corrugations or ribs extend continuously around the entire circumference of the flange on the cover and the walls of the channel of the tank and the sealing cement also extends continuously around the circumference of the tank and cover between the channel and flange thereof so that contact surface between the same in a vertical direction is tortuous in all parts of the same and forms an extended path over which the acid must pass before it can escape, thereby to prevent the acid June 2, 1925.　　　　　J. M. COLLINGWOOD　　　　　1,540,253

GOLF BALL TEE MOLD

Filed July 9, 1923

Inventor

By John M. Collingwood

Attorney